United States Patent [19]

Wamstad

[11] Patent Number: 4,509,880
[45] Date of Patent: Apr. 9, 1985

[54] VERY HIGH HERMETICITY GLASS TO METAL SEAL

[75] Inventor: David B. Wamstad, Roseville, Minn.

[73] Assignee: Honeywell Inc., Minneapolis, Minn.

[21] Appl. No.: 248,135

[22] Filed: Mar. 30, 1981

[51] Int. Cl.³ .............................................. F16B 11/00
[52] U.S. Cl. .................................. 403/179; 403/272; 65/59.24
[58] Field of Search ...................... 403/179, 404, 272; 65/59.24, 59.40

[56] References Cited

U.S. PATENT DOCUMENTS

| | | | |
|---|---|---|---|
| 2,728,425 | 12/1955 | Day ................................ | 403/272 X |
| 2,842,699 | 7/1958 | Germeshausen et al. ....... | 403/272 X |
| 2,848,594 | 8/1958 | Aversten ......................... | 403/272 X |
| 3,030,124 | 4/1962 | Holloway ........................ | 403/272 X |
| 3,667,109 | 6/1972 | Alcenlus ......................... | 403/272 X |
| 4,103,200 | 7/1978 | Bhalla ............................. | 65/59.24 X |

OTHER PUBLICATIONS

Book: Glass-To-Metal Seals, by J. H. Partridge, published in 1949, by The Society of Glass Technology, "Elmfield", Northumberland Rd., Sheffield, 10, England, Chapter 6 cited, pp. 70-86.

Primary Examiner—Andrew V. Kundrat
Attorney, Agent, or Firm—Stephen W. Buckingham; Roger W. Jensen

[57] ABSTRACT

A very high hermeticity glass to metal seal comprising a round cylindrically shaped glass member having an outside diameter; a tubular sleeve of resilient metal having (i) a first end with an inside diameter slightly larger than said outside diameter of said glass member, and (ii) a reduced diameter portion adjacent to said first end thereof with the diameter of said reduced diameter portion being slightly smaller than the outside diameter of the glass member; a thin metalized layer on a first end of the glass member adapted to be inserted into said first end of the tubular metal sleeve so as to define an annular gap therebetween, the glass member being inserted as far as possible into the sleeve so that the end thereof is into abutting relation with said reduced diameter portion of said sleeve so as to form a capillary gap therebetween. Subsequently solder means is flowed, while in a molten form, into said annular gap pursuant to a pulling-like force into said capillary gap thus forming, when said solder means cools, a very high hermeticity glass to metal seal.

4 Claims, 3 Drawing Figures

VERY HIGH HERMETICITY GLASS TO METAL SEAL

BRIEF SUMMARY OF THE INVENTION

The subject invention comprises a very high hermeticity glass to metal seal having special utility in the field of electromechanical pressure transducers comprising in part semiconductor pressure transducers mounted on a glass support means such as a round cylindrically shaped member which in turn must be connected to a metal conduit. The present invention therefore comprises a round cylindrically shaped glass member having an outside diameter; a tubular sleeve of resilient metal having a first end with an inside diameter slightly larger than said outside diameter of said glass member. The sleeve further has a reduced diameter portion adjacent to said first end thereof with the diameter of said reduced diameter portion being slightly smaller than the outside diameter of the glass member. The glass member has a thin metalized layer on a first end thereof. The metalized first end of said glass member is adapted to be inserted into said first end of the tubular metal sleeve so as to define an annular gap therebetween and a glass member is inserted as far as possible into the sleeve so that the end thereof is into abutting relation with said reduced diameter portion of said sleeve so as to form a capillary gap therebetween. Subsequently solder means is flowed, while in a molten form, into said annular gap pursuant to a pulling-like force into said capillary gap thus forming, when said solder means cools, a very high hermeticity glass to metal seal

DESCRIPTION OF THE PREFERRED EMBODIMENT

Figure 1:
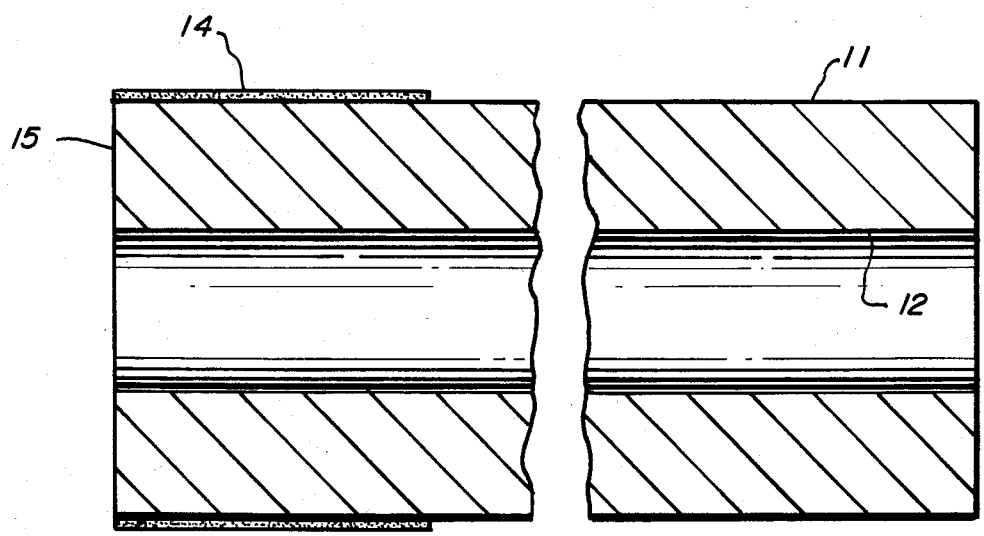
FIG. 1 is a cross sectional view of a round cylindrically shaped glass member adapted for use in the present invention.

Referring to FIG. 1, the reference numeral 10 designates a round cylindrically shaped glass member having an outside diameter 11. When the device is used in a pressure transducer, the glass member 10 will typically have a central bore 12 therein. Member 10 may be made of any appropriate glass meterial; in my preferred embodiment, I use glass tubing manufactured and sold by Corning Glass Works, catalogue number 7740 under the registered trademark PYREX. Such PYREX material has a coefficient of thermal of expansion of approximately $3.25 \times 10^{-6}$ inch/inch/°C.

A thin metalized layer 14 is provided at one end of glass member 10. Such metalizing permits the bonding of solder to the glass tube 10 and in my preferred embodiment I use a high content platinum-silver metalization with a double coat; the type is similar to 3730 CONDUCTR.X manufactured by Thick Film Systems Inc. The approximate thickness of this layer of metalization is 0.001 inch. Alternate metalizations are a first thin film layer of titanium containing 10% tungsten, the layer being approximately 1000Å thick followed by a second thin film layer of nickel approximately 3500Å thick, followed by a third thin film layer of gold approximately 1000Å thick or a chrome layer approximately Å thick followed by a second film layer of nickel approximately 3500Å thick, followed by a thick film of gold approximately 1000Å thick. Further, other variations are to replace the 90% titanium - 10% tungsten with (1) 100% titanium or (2) 100% tungsten. Further, the nickel may be replaced by platinum. The end 15 of tube 10 adjacent to the end having the metalization film 14 thereon, is especially rough ground, this is important in developing the capillary gap to be explained below.

Figure 2:
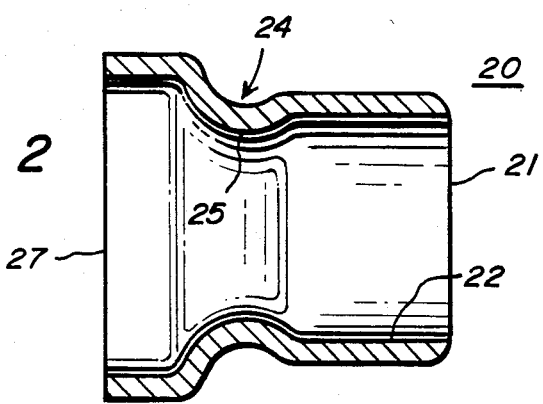
FIG. 2 is a cross sectional view of a tubular sleeve of resilient metal.

Referring to FIG. 2, a tubular sleeve is designated by reference numeral 20 comprising a first end thereof 21 having an inside diameter 22 which is slightly larger than the outside diameter 11 of tubular member 10. Sleeve 20 further has a reduced diameter portion 24 immediately adjacent to first end 21 with the inside diameter of reduced portion 24 (designated by reference numeral 25) being slightly smaller than the outside diameter 11 of the glass tubular member 10. The other end 27 of the metal sleeve 20 is shown slightly larger in diameter than the first end (but need not be) and has utility and is adapted to coact with other means not shown. For sleeve 20 I use, in the preferred embodiment, a resilient metal known as Kovar having a nominal thickness of 0.015 inches plus or minus 0.0015 inches in thickness. Other metals which may be used are a low carbon cold rolled steel or stainless steel. The approximate coefficient of temperature expansion for Kovar is between $4.86 \times 10^{-6}$ inch/inch/°C. Kovar has an approximate yield strength of 39,000 PSI at 213° C. and is available from metal specialty distributors.

Figure 3:
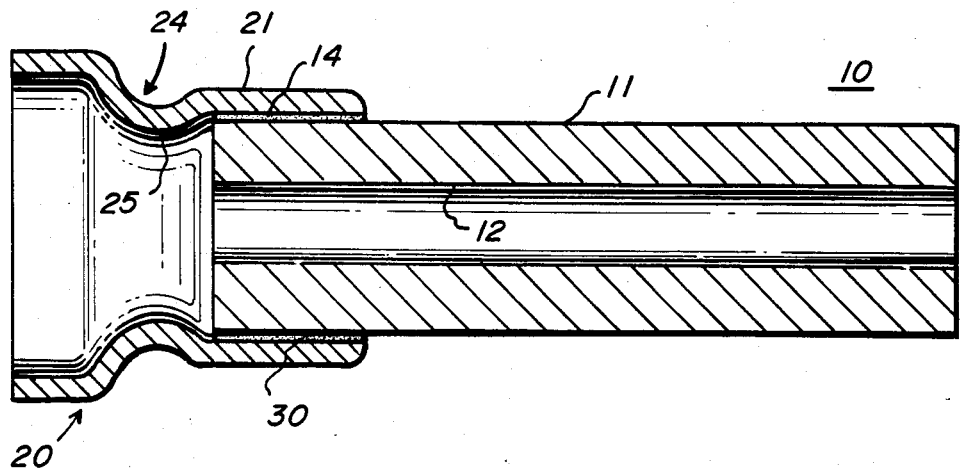
FIG. 3 is a cross sectional view of an assembly of the glass member and the tubular resilient metal sleeve.

In FIG. 3, the glass tubular member 10 with the metalization layer 14 already applied thereto is shown inserted into the first end 21 of the metal sleeve 20 with the end 15 of tubular member 10 pushed into abutting relationship with the portion 25, i.e., the reduced diameter portion of sleeve 20. Thus, an annular gap is defined between the outside surface of the metalization 14 and the inside diameter 22 of the first end 21 of the sleeve 20. The approximate size of this annular gap in the preferred embodiment is approximately 0.003 inches. Further, the end 15 of tubular member 10 coacting with reduced diameter portion 25 of sleeve 20 defines a capillary gap of approximately 0.001 inches in the preferred embodiment.

The next step is the soldering together of the glass tubular member 10 and the sleeve 20. In the preferred embodiment, I use solder comprising 99.95% tin with an eutectic temperature of 232° C. and a standard flux. The solder tends to be sucked into the annular gap under the drawing or pulling-like forces of the capillary gap above described. Further, the resultant hermetic seal is astonishingly good, i.e., a very high hermeticity glassed metal seal is produced. Further the seal is achieved on a very consistent basis in production, i.e., a very high yield rate. More specifically, with my invention I can achieve, on a very consistent basis, hermetic seals in the order of $5 \times 10^{-11}$ cc/sec. helium, at standard conditions. Furthermore, the subject invention very successfully passes temperature cycling from minus 55° C. to plus 150° C. and also temperature shock minus 200° C. to plus 200° C. testing without failure of the glass to metal seal. This is not withstanding the substantial difference in coefficient of temperature expansion between the metal sleeve 20 and the glass tubular member 10. The key reason for this ability to withstand temperature cycling and temperature shock is that the sleeve 20 has sufficient resiliency, based on its thickness aspect ratio. The thickness used in my invention is 0.015 inches, this produces some yielding or expansion of the end of the sleeve 21, which is in bonded connection with the metalization 14 on the end 15 of the glass cylindrical member 10. The normal operations temperature of the seal is in the range of minus 40° C. to plus 125° C. This range does not stress the metal beyond its yield point. However, during this initial temperature cycling incident to the manufacturing process, the seal is subjected to a cold enough temperature (e.g. $-55°$ C.) so that the metal yields at that time only which is advantageous because it minimizes stresses in the seal. My invention is a significant and substantial improvement over prior art glass to metal seals which have one or more of the following shortcomings: (i) low yield rate in production, (ii) low hermeticity seals (too excessive leak rate for applications such as high performance pressure transducers), and (iii) fractured seals from temperature changes.

While I have described a preferred embodiment of my invention, it will be understood that the invention is limited only by the scope of the following claims.

I claim:
1. A highly hermetic glass to metal seal comprising:
   a round cylindrically shaped glass member having an outside diameter;
   a tubular sleeve of resilient metal having a first end with an inside diameter slightly larger than said outside diameter of said glass member, and said sleeve having a reduced diameter portion adjacent to said first end, said reduced diameter portion having an inside diameter slightly smaller than said outside diameter of said glass member;
   a thin metalization layer having a first thin film layer of a titanium-tungsten alloy, a second thin film layer of nickel and a third thin film layer of gold, said metalization layer being on a first end of said glass member, said metalized first end of said glass member being inserted into said first end of said tubular metal sleeve so as to define an annular gap therebetween and into abutting relation with said reduced diameter portion of said sleeve so as to form a capillary gap therewith; and
   solder mean flowed while in a molten form into said annular gap pursuant to a pulling-like force of said capillary gap.

2. The seal of claim 1 wherein said titanium-tungsten alloy includes approximately 10% tungsten.

3. The seal of claim 1 wherein said thin film layer of titanium-tungsten alloy is approximately 1000Å thick, said thin film layer of nickel is approximately 3500Å thick, and said thin film layer of gold is approximately 1000Å thick.

4. The seal of claim 3 wherein said titanium-tungsten alloy includes approximately 10% tungsten.

* * * * *